(12) United States Patent
Parks (10) Patent No.: US 9,886,938 B2
(45) Date of Patent: Feb. 6, 2018

(54) TRANSDUCER ARRAY HAVING A TRANSCEIVER

(71) Applicant: Navico Holding AS, Egersund (NO)

(72) Inventor: David Parks, Tulsa, OK (US)

(73) Assignee: NAVICO HOLDING AS, Egersund (NO)

( * ) Notice: Subject to any disclaimer, the term of this patent is extended or adjusted under 35 U.S.C. 154(b) by 334 days.

(21) Appl. No.: 14/618,987

(22) Filed: Feb. 10, 2015

(65) Prior Publication Data

US 2016/0232884 A1    Aug. 11, 2016

(51) Int. Cl.
| | | |
|---|---|---|
| G10K 11/00 | (2006.01) |
| G01S 7/54 | (2006.01) |
| G01S 15/00 | (2006.01) |
| G01S 15/87 | (2006.01) |
| G01S 15/88 | (2006.01) |
| G01S 7/62 | (2006.01) |
| G01S 15/42 | (2006.01) |
| G01S 15/89 | (2006.01) |
| G01S 13/00 | (2006.01) |
| G01S 13/87 | (2006.01) |
| G01S 13/93 | (2006.01) |

(52) U.S. Cl.
CPC ............ *G10K 11/008* (2013.01); *G01S 7/54* (2013.01); *G01S 7/6218* (2013.01); *G01S 7/6281* (2013.01); *G01S 15/003* (2013.01); *G01S 15/42* (2013.01); *G01S 15/876* (2013.01); *G01S 15/88* (2013.01); *G01S 15/89* (2013.01); *G01S 13/003* (2013.01); *G01S 13/878* (2013.01); *G01S 13/9307* (2013.01)

(58) Field of Classification Search
CPC ..................................................... G10K 11/008
See application file for complete search history.

(56) References Cited

U.S. PATENT DOCUMENTS

| | | |
|---|---|---|
| 3,311,871 A | 3/1967 | Sidney |
| 3,436,721 A | 4/1969 | Farr |
| 4,244,026 A * | 1/1981 | Dickey, Jr. .............. G01S 15/60 367/89 |
| 4,879,697 A | 11/1989 | Lowrance et al. |
| 5,025,423 A | 6/1991 | Earp |

(Continued)

FOREIGN PATENT DOCUMENTS

| | | |
|---|---|---|
| WO | WO 2007/025572 A1 | 3/2007 |
| WO | WO 2008/105932 A2 | 9/2008 |
| WO | WO 2010/100868 A1 | 9/2010 |

OTHER PUBLICATIONS

PCT International Search Report and Written Opinion; PCT/US2013/048177; dated Oct. 21, 2013.

(Continued)

*Primary Examiner* — Hovhannes Baghdasaryan
(74) *Attorney, Agent, or Firm* — Nelson Mullins Riley & Scarborough LLP (57) ABSTRACT

Various implementations described herein are directed to a transducer array. The transducer array may include a first receiver having a first aperture width. The transducer array may include a second receiver having a second aperture width that is substantially equal to the first aperture width. The transducer array may also include a transceiver having a third aperture width that is larger than the first aperture width and the second aperture width.

13 Claims, 6 Drawing Sheets

(56) References Cited

U.S. PATENT DOCUMENTS

| | | | |
|---|---|---|---|
| 5,050,133 | A | 9/1991 | Buddery |
| 5,103,129 | A * | 4/1992 | Slayton .............. B06B 1/0622 310/334 |
| 5,184,330 | A | 2/1993 | Adams et al. |
| 6,120,450 | A | 9/2000 | Li |
| 6,130,641 | A | 10/2000 | Kraeutner et al. |
| 6,201,767 | B1 | 3/2001 | Lagace et al. |
| 6,285,628 | B1 | 9/2001 | Kiesel |
| 6,438,071 | B1 | 8/2002 | Hansen et al. |
| 8,300,499 | B2 | 10/2012 | Coleman et al. |
| 8,305,840 | B2 | 11/2012 | Maguire |
| 8,605,550 | B2 | 12/2013 | Maguire |
| 8,717,847 | B2 | 5/2014 | Blake |
| 2002/0035444 | A1 | 3/2002 | Wilkerson et al. |
| 2002/0167862 | A1 * | 11/2002 | Tomasi .............. G01S 5/18 367/118 |
| 2003/0081503 | A1 | 5/2003 | Barnard et al. |
| 2003/0235112 | A1 | 12/2003 | Zimmerman et al. |
| 2004/0165479 | A1 | 8/2004 | Scoca et al. |
| 2005/0007880 | A1 | 1/2005 | Zimmerman et al. |
| 2005/0099887 | A1 | 5/2005 | Zimmerman et al. |
| 2005/0101867 | A1 * | 5/2005 | Johnson .............. A61B 8/14 600/459 |
| 2005/0195103 | A1 | 9/2005 | Davis et al. |
| 2006/0013066 | A1 | 1/2006 | Nishimori et al. |
| 2007/0044559 | A1 * | 3/2007 | Andrews ........... G01N 29/4427 73/584 |
| 2007/0285315 | A1 | 12/2007 | Davis et al. |
| 2010/0067822 | A1 | 3/2010 | Young |
| 2010/0080082 | A1 | 4/2010 | Betts et al. |
| 2010/0170617 | A1 | 7/2010 | Woods et al. |
| 2011/0013484 | A1 | 1/2011 | Coleman et al. |
| 2011/0013485 | A1 | 1/2011 | Maguire |
| 2012/0163126 | A1 | 6/2012 | Campbell et al. |
| 2012/0281507 | A1 | 11/2012 | Rikoski |
| 2013/0208568 | A1 | 8/2013 | Coleman |
| 2014/0010048 | A1 | 1/2014 | Proctor |
| 2014/0010049 | A1 | 1/2014 | Proctor |
| 2014/0269163 | A1 | 9/2014 | Proctor |
| 2014/0269192 | A1 | 9/2014 | Proctor |
| 2015/0369908 | A1 | 12/2015 | Zimmerman et al. |
| 2016/0259049 | A1 | 9/2016 | Proctor et al. |
| 2016/0259053 | A1 | 9/2016 | Proctor et al. |
| 2016/0341827 | A1 | 11/2016 | Horner et al. |
| 2017/0082739 | A1 | 3/2017 | Horner et al. |

OTHER PUBLICATIONS

PCT International Search Report and Written Opinion; PCT/US2013/048129; dated Oct. 17, 2013.

IEEE Xplore Abstract—A low-complexity data-dependent beamformer [online] [retrieved Nov. 12, 2015]. Retrieved from the Internet: <URL: http://ieeexplore.ieee.org/xpl/freeabs_all.jsp?arnumber=5716445&abstractAcces-no&us . . . > (Feb. 2011) 2 pages.

IEEE Xplore Abstract—Improving Sonar Performance in Shallow Water Using Adaptive . . . [online] [retrieved Nov. 12, 2015]. Retrieved from the Internet: <URL:http://ieeexplore.ieee.org/xpl/articleDetails.jsp?reload=true&arnumber=6401207>. (Apr. 2013) 2 pages.

European Search Report for European Application No. EP16170460.6 dated Sep. 23, 2016.

Kraeutner et al.; *Rethinking Forward-Looking Sonar for a AUV'S: Combining Horizontal Beamforming with Vertical Angle-of-Arrival Estimation*; Teledyne RD Instruments; Sep. 4, 2008.

Llort-Pujol et al.; *Advanced interferometric techniques for high-resolution bathymetry*; Journal of Marine Technology Society; Mar. 1, 2012; vol. 46, No. 2; pp. 1-27.

Sărăcin et al.; "Interferometric Bathymetry—principles and utility"; Oct. 8, 2013; 1st European Conference of Geodesy and Geomatics Engineering; pp. 198-205.

Extended European Search Report for European Application No. EP16189168.4 dated Jan. 31, 2017.

Synnevag et al., "A low complexity data-dependent beamformer:", Ultrasonics Symposium 2008, Nov. 2, 2008, pp. 1084-1087.

Synnevag et al., "A low complexity data-dependent beamformer;", IEEE Transactions on Ultrasonics Ferroelectrics and Frequency Control, vol. 58, No. 2, Feb. 1, 2011, pp. 281-289.

Blomberg et al., "Improving Sonar Performance in Shallow Water Using Adaptive Beamforming", IEEE Journal of Oceanic Engineering, vol. 38, No. 2, Apr. 1, 2013, pp. 297-307.

U.S. Appl. No. 62/128,635, filed Mar. 5, 2015, in re: Proctor et al., entitled Systems and Associated methods for Producing a 3D Sonar Image.

U.S. Appl. No. 62/128,641, filed Mar. 5, 2015, in re: Kirmani, entitled Methods and Apparatuses for Reconstructing a 3D Sonar Image.

ITC Application Equations for Underwater Sound Transducers, Published by International Transducer Corporation, 1995, Rev. 8/00; 3 pages.

* cited by examiner

TRANSDUCER ARRAY HAVING A TRANSCEIVER

BACKGROUND

Discussion of the Related Art

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

Operators of marine vessels may use instruments to map the water and underwater terrain in the vicinity of the marine vessel, and to detect fish or objects in the water. The map of the underwater terrain within the vicinity of the vessel may be used for navigation purposes, while fishing, or for other purposes. Accordingly, it is important for the operator of the vessel to have a visualization of the water and terrain in the vicinity of the vessel.

SUMMARY

Described herein are implementations of various technologies for a transducer array. The transducer array may include a first receiver having a first aperture width. The transducer array may include a second receiver having a second aperture width that is substantially equal to the first aperture width. The transducer array may also include a transceiver having a third aperture width that is larger than the first aperture width and the second aperture width.

Described herein are also implementations of various technologies for a method. The method may include transmitting acoustic signals with a transceiver. The method may include receiving first reflected signals at a first receiver. The method may include receiving second reflected signals at a second receiver. The method may also include receiving third reflected signals at the transceiver. The first receiver has a first aperture width. The second receiver has a second aperture width that is substantially equivalent to the first aperture width. The transceiver has a third aperture width that is larger than the first aperture width and the second aperture width.

Described herein are also implementations of various technologies for a transducer array. The transducer array may include a first receiver having a first aperture width. The transducer array may include a second receiver having a second aperture width that is substantially equal to the first aperture width. The transducer array may include a first element having a first portion of a transceiver. The transducer array may also include a second element having a second portion of the transceiver.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

In certain implementations of various techniques described herein, a vessel may be configured to map the water and underwater terrain in the vicinity of the vessel. The vessel may map the water and underwater terrain in the vicinity of the vessel using a transducer array for transmitting and receiving acoustic signals through the water in the vicinity of the vessel. A marine electronics device on board the vessel may be used to display an image of the water and underwater features from the acoustic signals received by the transducer array.

In general, the transducer array transmits acoustic signals, which bounce off of various underwater features and result in reflected signals that are received at the transducer array. The marine electronics device can then determine or estimate the distance of an underwater feature from the transducer array, or the depth of an underwater feature, based on the delay between the transmitted acoustic signals and the reflected signals. The marine electronics device can determine or estimate the angle of the underwater feature based on the relative delays of the reflected signals at various positions of the transducer array. The vessel is described in more detail with reference to FIG. 1. The transducer array is described in more detail with reference to FIGS. 2 and 3. The transmitted and reflected signals are described with reference to FIGS. 4-5. The method for determining the distance and angle of an underwater feature is described in more detail with reference to FIG. 6. The marine electronics system is described with reference to FIG. 7.

Figure 1:
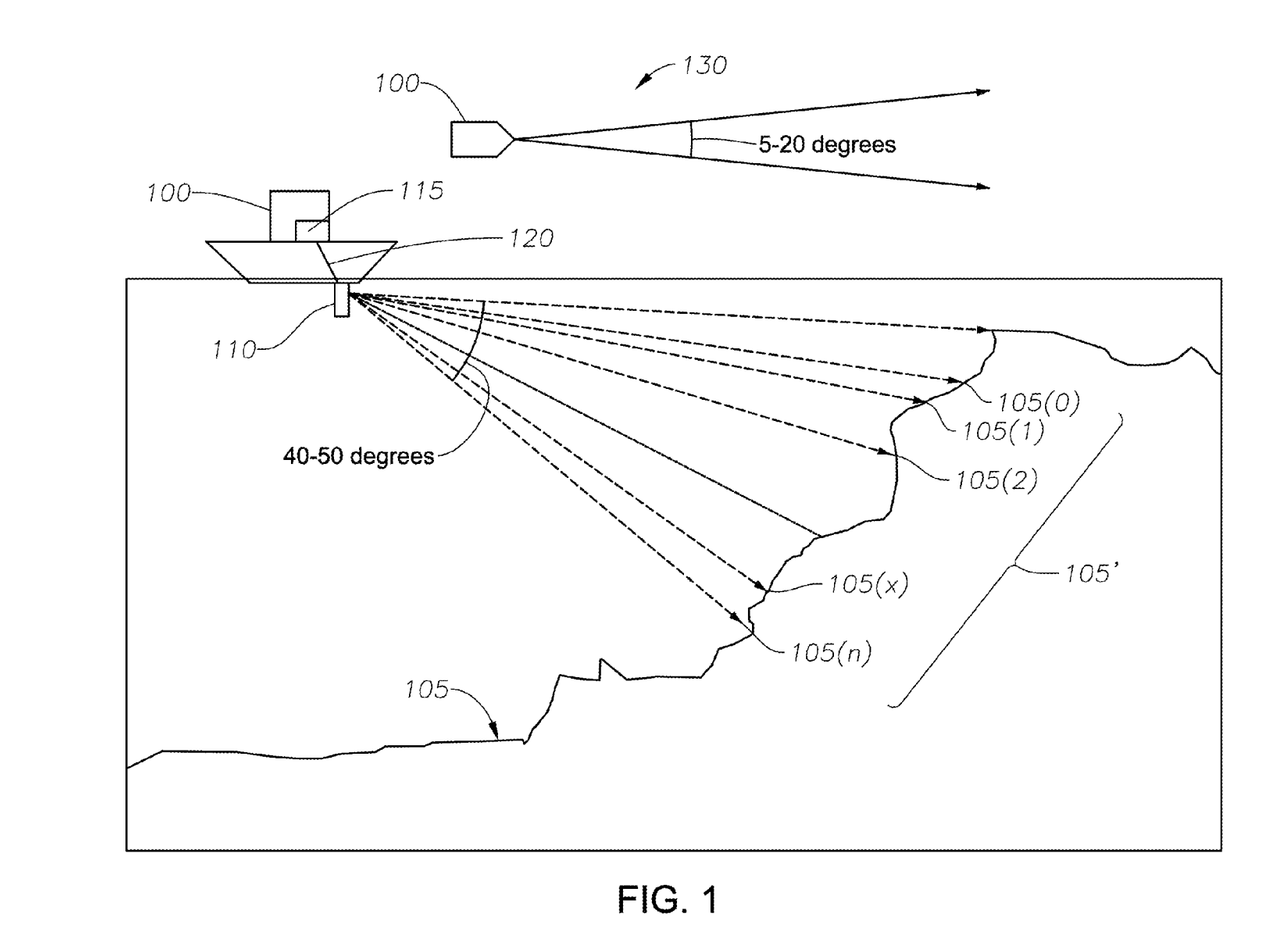
FIG. 1 is a diagram of a vessel in accordance with implementations of various techniques described herein.

FIG. 1 is a diagram of a vessel 100 in connection with various techniques described herein. The vessel 100 includes instrumentation, which will be described in greater detail below, to navigate the open water. The open water includes an underwater terrain 105 that may include natural formations that cause variations in the depths in the underwater terrain 105. The open water may also include fish or other objects.

The vessel 100 includes a transducer array 110, a marine electronics device 115, and a connection 120. The transducer array 110 transmits and receives acoustic signals that propagate through the open water in the vicinity 105' of the vessel 100. The open water in the vicinity of the vessel 100 through which signals propagate can include a plane defined by a radius and a first arc. The width of the plane can also be defined by radius r and a second arc. In one implementation, the first arc may be between 40 to 50 degrees, and the second arc may be between 5-20 degrees. The second arc is illustrated in view 130, which is a top view of the vessel 100.

After the acoustic signals are transmitted by the transducer array 110, the acoustic signals reflect off of features 105(0-n) in the vicinity 105' of the vessel. The transducer array 110 then receives the reflected signals. A marine electronics device 115 may process the reflected signals and display the location of features 105(0-n).

The signals received by the transducer array 110 are transmitted to the marine electronics device 115 over the connection 120. For example, the connection 120 may be a bus, wires, cables, or a wireless connection. The marine electronics device 115 may then process the signals received by the transducer array 110. The marine electronics device 115 may determine a range or distance and an angle of reflection, also referred to as the angle of incidence, corresponding to the reflected signals. For example, the range and angle of incidence may be determined based on a time delay between the reflected signals received at different locations, or elements, on the transducer array 110, i.e., phase shift, and the array pitch. An array pitch may be defined as the center to center distance between elements in the transducer array 110.

Figure 2:
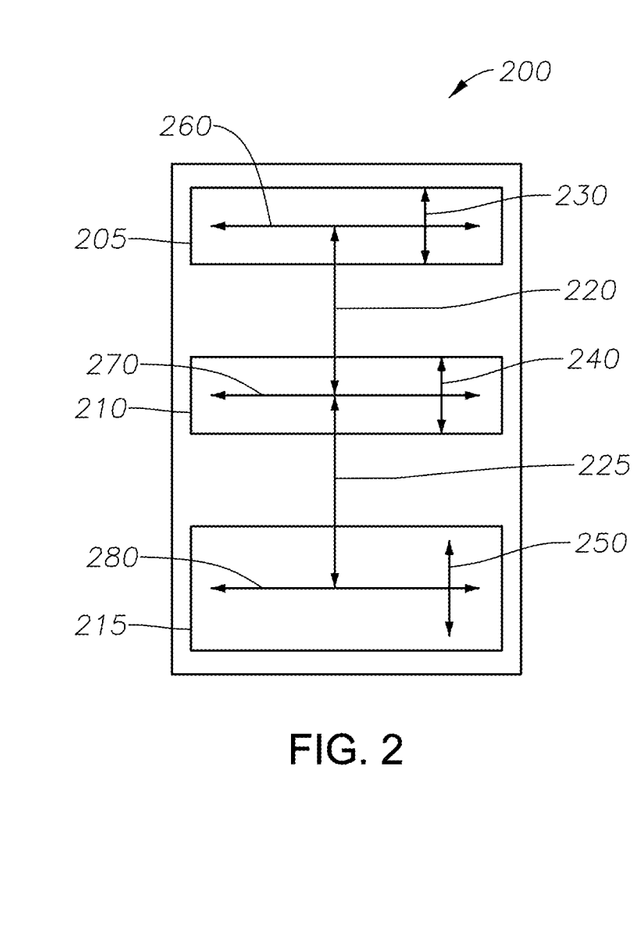
FIG. 2 is an illustration of a transducer array having a unitary transceiver in accordance with implementations of various techniques described herein.

FIG. 2 is an illustration of a transducer array 200 having a unitary transceiver in accordance with implementations described herein. The transducer array 200 includes a first receiver 205, a second receiver 210, and a transceiver 215. A transceiver 215 is a device that is capable of transmitting and receiving signals. For example, a portion of the circuitry in the transceiver 215 may be commonly used for both transmitting and receiving signals. The first receiver 205 or second receiver 210 may be a crystal receiver. The transceiver 215 may be a crystal transceiver.

In operation, the transducer array 200 may be fixed to a marine vessel. The transceiver 215 may transmit acoustic signals in the vicinity of the vessel. The first receiver 205, the second receiver 210, and the transceiver 215 may then receive reflected signals.

The first receiver 205 has an aperture width 230 and a length 260. The second receiver 210 has an aperture width 240 and a length 270. The transceiver 215 has an aperture width 250 and a length 280. In one implementation, widths 230 and 240 may be equivalent or substantially equivalent, and lengths 260, 270, and 280 may be equivalent or substantially equivalent. The width 250 of the transceiver 215 may be larger than the widths 230 and 240.

In a filled array, the pitch may be one half of the wavelength of signals transmitted by the array, so as to provide unambiguous data. The total array length of the filled array is limited by the number of array elements. The transducer 200 may have a pitch that is greater than one half of the wavelength of signals transmitted by the transceiver 215. The transducer 200 may be referred to as a sparse array. The transmit beam of the transducer 200 may be configured to prevent acoustic energy from entering the zone in which the sparse array produces ambiguous results.

The transducer 200 comprises three subarrays with different pitches. The first subarray is an array composed of the receivers 205 and 210. The first subarray has a pitch 220. The second subarray is an array composed of the receiver 210 and the transceiver 215. The second subarray has a pitch 225. The third subarray is an array composed of the receiver 205 and the transceiver 215. The third subarray has a pitch that is the sum of pitches 220 and 225. In one implementation, pitches 220 and 225 may be approximately equivalent. The ambiguity of signals received by the transducer array 200 may increase as the pitch of the subarrays increases in size compared to the wavelength. The first subarray may be the least ambiguous of the three subarrays.

For example, the transducer 200 may be configured so that the first subarray may be effectively unambiguous. The second and third subarray may be ambiguous, regardless of the configuration of the transmit pattern.

Figure 7:
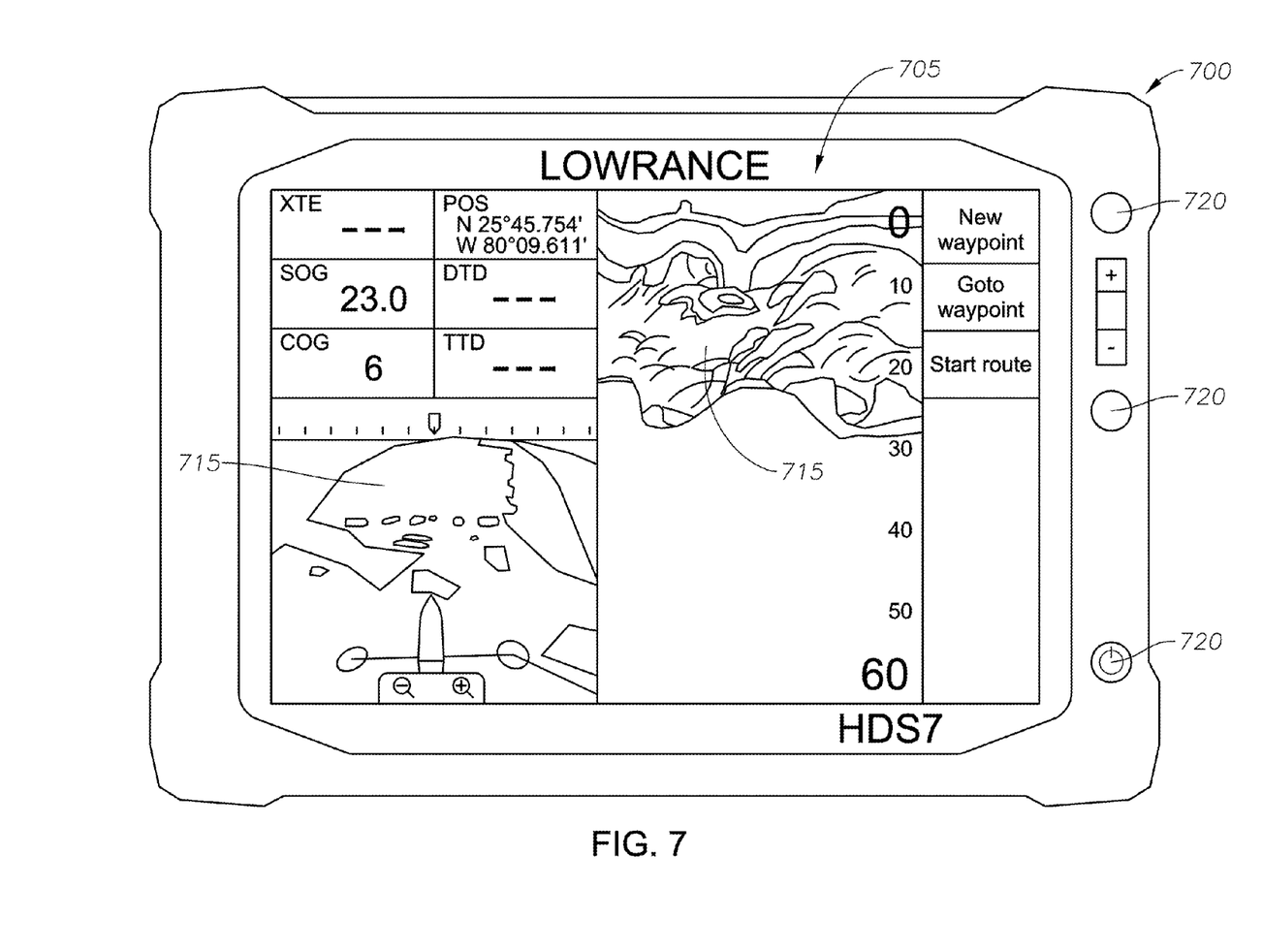
FIG. 7 is a marine electronics device in accordance with implementations of various techniques described herein.

The connection 120 between the transducer array 200 and a marine electronics device, such as the marine electronics device 700 described in FIG. 7, may include a first wire connected to the first receiver 205, a second wire connected to the second receiver 210, and a third wire connected to the transceiver 215.

Figure 3:
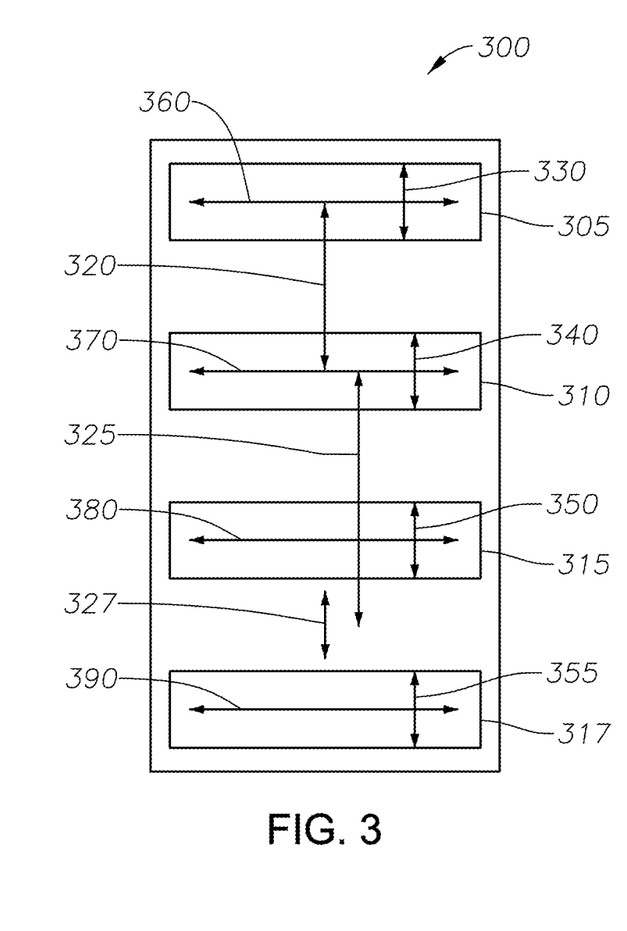
FIG. 3 is an illustration of a transducer array having a split transceiver in accordance with implementations of various techniques described herein.

FIG. 3 is a block diagram of a transducer array 300 having a split transceiver in accordance with implementations described herein. The transducer array 300 includes a first receiver 305, a second receiver 310, and a transceiver divided into two transceiver portions 315 and 317. The first receiver 305 and second receiver 310 may be crystal receivers. The portions 315 and 317 may be portions of a crystal transceiver.

The first receiver 305 has an aperture width 330 and a length 360. The second receiver 310 has an aperture width 340 and a length 370. The first transceiver portion 315 has an aperture width 350 and a length 380. The second transceiver portion 317 has an aperture width 355 and a length 390. Widths 330 and 340 may be equivalent or substantially equivalent. Widths 350 and 355 may be equivalent or substantially equivalent. Lengths 360, 370, 380, and 390 may be equivalent or substantially equivalent. In one implementation, widths 330, 340, 350, and 355 may be equivalent or substantially equivalent. The first transceiver portion 315 and second transceiver portion 317 may be separated by a space 327. The space 327 may be foam placed between the portions 315 and 317. Compared to a single transceiver element, the transceiver portions 315 and 317 may transmit signals, i.e., a transmit beam, with a narrower beam for the same frequency.

The transducer 300 may have a pitch that is greater than one half of the wavelength of signals transmitted by the transceiver portions 315 and 317, i.e., a sparse array. The transmit beam may be configured to prevent acoustic energy from entering the zone in which the sparse array produces ambiguous results.

The transducer 300 comprises three subarrays with different pitches. The first subarray is an array composed of the receivers 305 and 310. The first subarray has a pitch 320. The second subarray is an array composed of the receiver 310 and the transceiver portions 315 and 317. The second subarray has a pitch 325. Pitch 325 extends from the center line of the receiver 310 to a point equidistant between the center line of the portion 315 and the center line of the portion 317. The third subarray is an array composed of the receiver 305 and the transceiver portions 315 and 317. The third subarray has a pitch that is the sum of pitches 320 and 325. In one implementation, pitches 320 and 325 may be approximately equivalent. The ambiguity of signals received by the transducer array 300 may increase as the pitch of the subarrays increases in size compared to the wavelength. The first subarray may be the least ambiguous of the three subarrays. For example, the transducer 300 may be configured so that the first subarray may be effectively unambiguous. The second and third subarray may be ambiguous, regardless of the configuration of the transmit pattern.

In one implementation, the connection 120 between the transducer array 300 and a marine electronics device, such as the marine electronics device 700 described in FIG. 7, may include a first wire connected to the first receiver 205, a second wire connected to the second receiver 210, and a third wire connected to both portions 315 and 317 of the transceiver. In this implementation, portions 315 and 317 of the transceiver may be connected in parallel. In yet another implementation, the first transceiver portion 315 and the second transceiver portion 317 may be connected in series.

Figure 4:
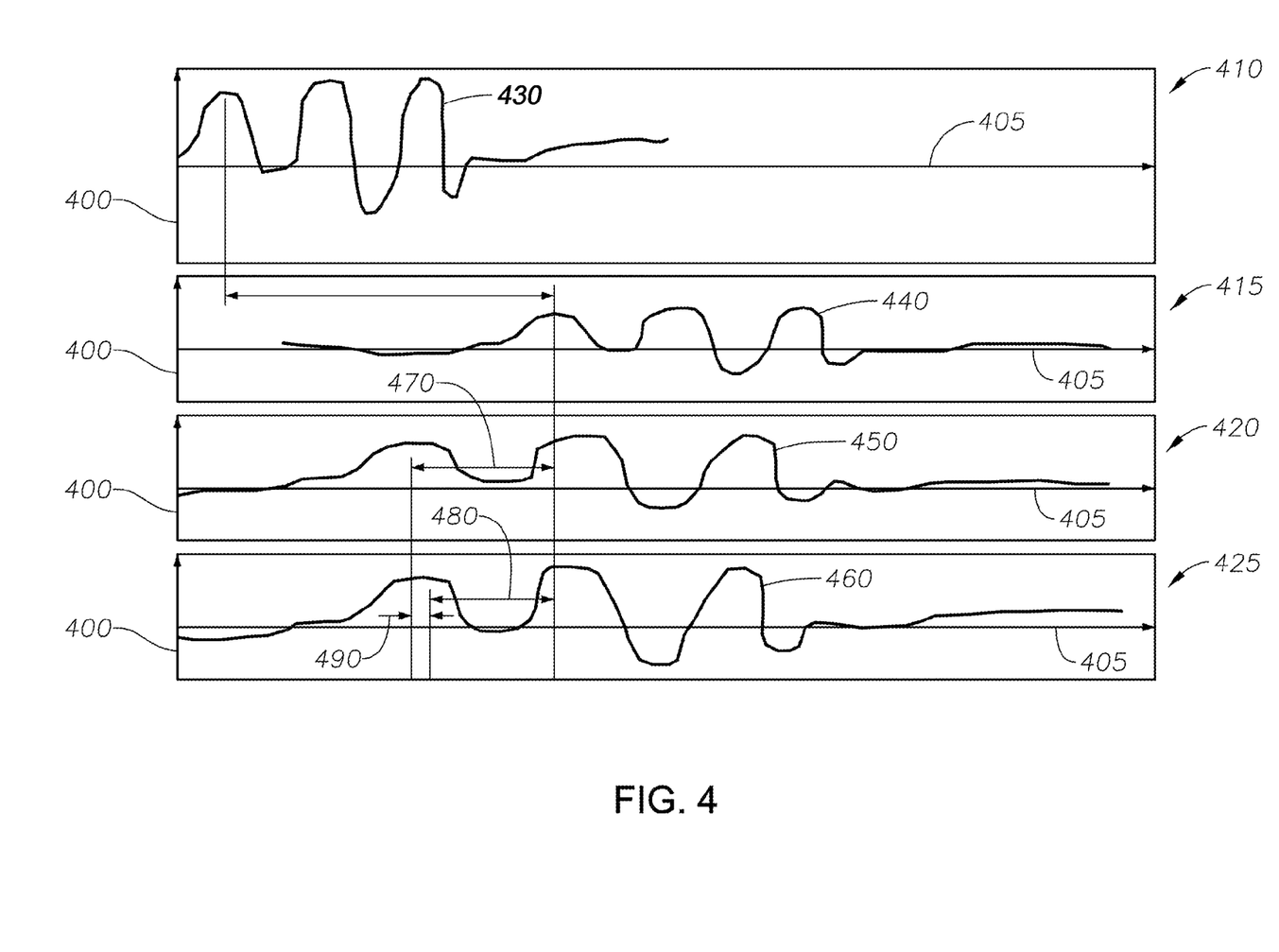
FIG. 4 illustrates graphs of signals transmitted and received at a transducer array in accordance with implementations of various techniques described herein.

FIG. 4 illustrates graphs of signals transmitted and received at a transducer array in accordance with implementations of various techniques described herein. The graphs illustrate signals transmitted and received at the transducer arrays 200 or 300, described above. In the graphs 410, 415, 420, and 425, the vertical axis 400 shows voltage and the horizontal axis 405 shows time. Graph 410 represents a signal 430 that is transmitted by a transceiver, such as the transceiver 215 in FIG. 2, or 315 and 317 in FIG. 3. Graph 415 represents a signal 440 that is received by a first receiver, such as the receiver 205 or 305. Graph 420 represents a signal 450 that is received by a second receiver, such as the receiver 210 or 310. Graph 425 represents a signal 460 that is received by the transceiver 200 or 300.

The signals 440, 450, and 460 are similar but offset in time. The offset in time between the signals 440 and 450 is illustrated by offset 470. The offset in time between the signals 450 and 460 is offset 490. The offset in time between signals 440 and 460 is offset 480. The offsets 470, 480, and 490 may be determined by the location of the receivers or transceivers in the transducer array. The offsets 470, 480, and 490 may be measured and then used to determine the angle of incidence.

Figure 5:
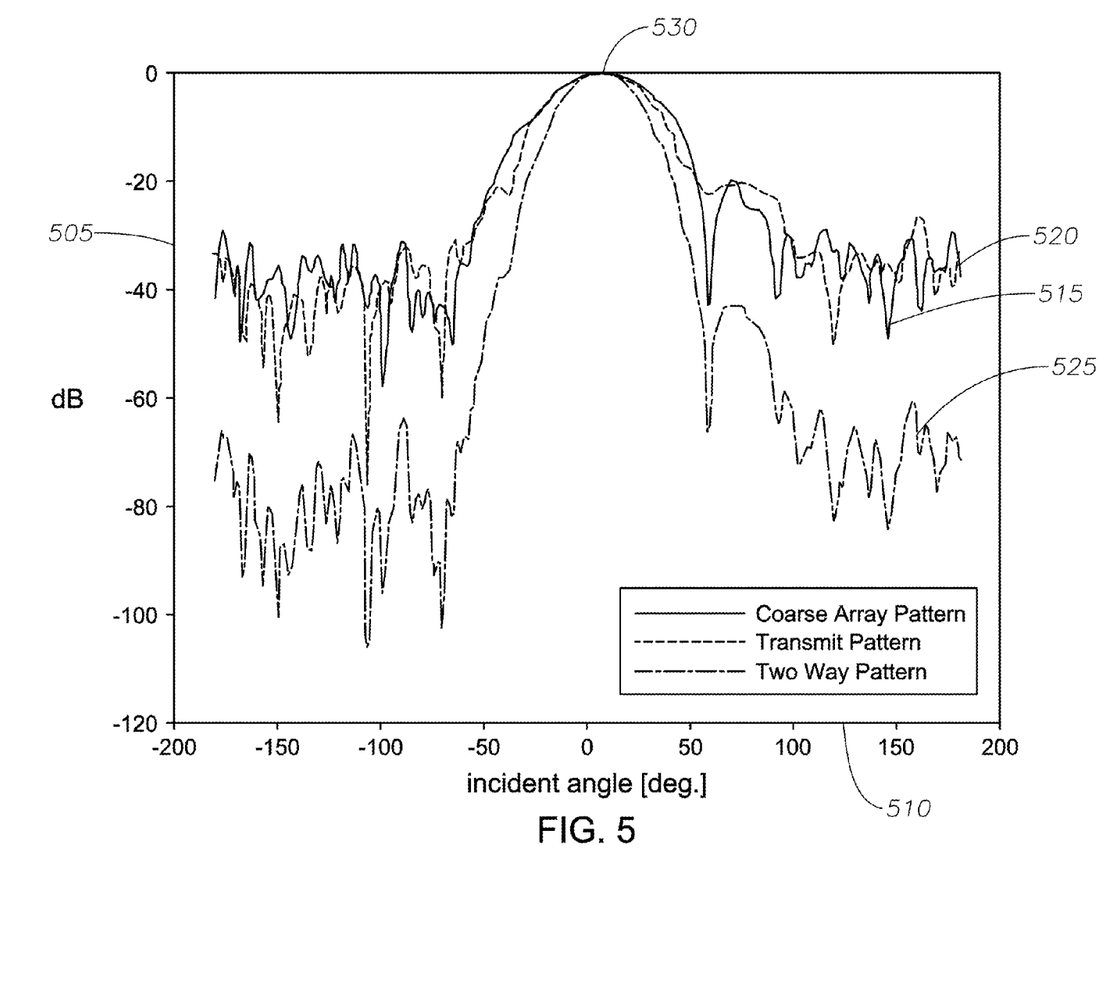
FIG. 5 illustrates a graph of a coarse array pattern, transmit pattern, and two way pattern in accordance with implementations of various techniques described herein.

FIG. 5 illustrates a graph of functions in accordance with various implementations described herein. The functions illustrate the relationship between signals, such as those illustrated in FIG. 4, that are received at a transducer array 200 or 300, described above. The vertical axis 505 shows decibels and the horizontal axis 510 shows angles. The graph represents a spatial plot of acoustic energy. The function 515 is a coarse array pattern, between two receivers, such as receivers 205 and 210 or 305 and 310. Function 520 is a transmit pattern of transceiver 215 or 315 and 317. Function 525 represents a two way coarse pattern.

Figure 6:
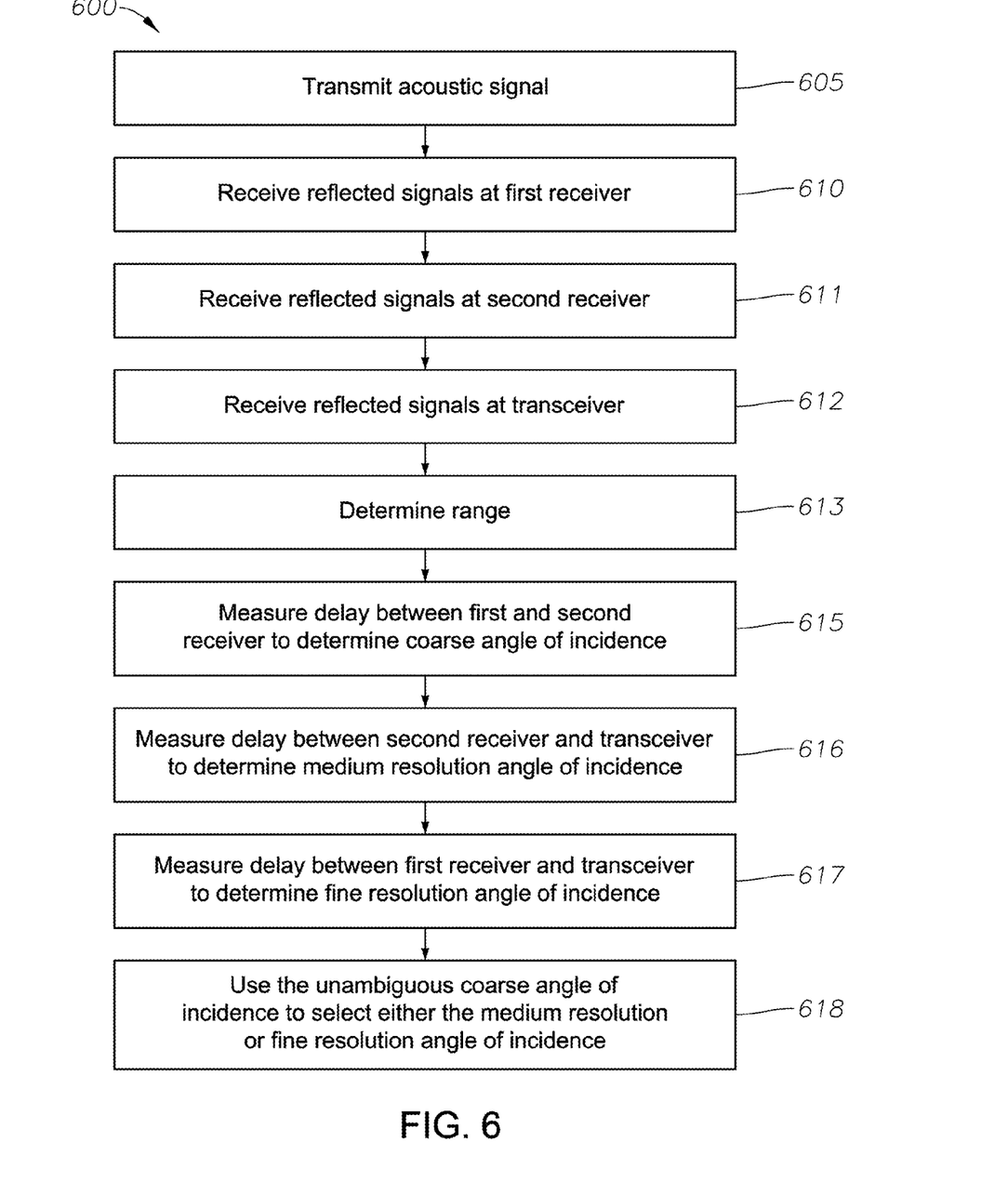
FIG. 6 is a flow diagram of a method for mapping the water around a vessel in accordance with implementations of various techniques described herein.

The coarse angle of incidence cannot be determined without ambiguity at angles greater than positive or negative 48 degrees. As such, the transceiver 215 or the transceiver portions 315 and 317 may be configured to minimize energy that is present at angles greater than positive or negative 48 degrees. As a result, the coarse array pattern may be approximately unambiguous when determining an angle of incidence. FIG. 6 describes a method in which the functions illustrated in FIG. 5 may be used to determine the angle of incidence.

FIG. 6 is a flow diagram of a method 600 for mapping the water around a vessel in accordance with various techniques described herein. In one implementation, method 600 may be performed by any computer system, such as a marine electronics device 700, and the like. It should be understood that while method 600 indicates a particular order of execution of operations, in some implementations, certain portions of the operations might be executed in a different order, and on different systems. Further, in some implementations, additional operations or steps may be added to the method 600. Likewise, some operations or steps may be omitted.

At block 605, a transceiver transmits an acoustic signal through the water surrounding a vessel. The transceiver may be a part of a transducer array. For example, the transceiver may be the transceiver 215 described in FIG. 2, or the transceiver formed by portions 315 and 317 in FIG. 3.

At blocks 610-612, the elements of the transducer array receive reflected signals. As illustrated in FIGS. 2 and 3, a transducer array may comprise a first receiver, second receiver, and transceiver. At block 610, a first receiver receives reflected signals. At block 611, a second receiver receives reflected signals. At block 612, the transceiver receives reflected signals.

At block 613, the distance or range of a feature may be determined. For example, the range may be determined by calculating a time delay between the transmitted and received signals. The range may be a distance between the transducer array and an underwater object or feature, where the signals are reflected by the underwater object or feature.

At block 615, a time delay is measured between the first and second receiver to determine a coarse angle of incidence. The coarse angle of incidence may be an unambiguous measurement. At block 616, a time delay is measured between the second receiver and the transceiver to determine a medium resolution angle of incidence. At block 617, a delay is measured between the first receiver and the transceiver to determine the fine resolution angle of incidence. The array pitch may be used to calculate the coarse angle of incidence at block 615, the medium resolution angle of incidence at block 616 or the fine resolution angle of incidence at block 617. The medium resolution angle of incidence and fine resolution angle of incidence may be ambiguous measurements.

At block 618, the coarse angle of incidence, which is the unambiguous measurement, may then be used to select the medium resolution angle of incidence or the fine resolution angle of incidence.

Computing System

Implementations of various technologies described herein may be operational with numerous general purpose or special purpose computing system environments or configurations. Examples of well-known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, tablets, wearable computers, cloud computing systems, virtual computers, marine electronics devices, and the like.

The various technologies described herein may be implemented in the general context of computer-executable instructions, such as program modules, being executed by a computer. Generally, program modules include routines, programs, objects, components, data structures, etc. that performs particular tasks or implement particular abstract data types. Further, each program module may be implemented in its own way, and all need not be implemented the same way. While program modules may all execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or both.

The various technologies described herein may be implemented in the context of marine electronics, such as devices found in marine vessels and/or navigation systems. Ship instruments and equipment may be connected to the computing systems described herein for executing one or more navigation technologies. As such, the computing systems may be configured to operate using sonar, radar, GPS and like technologies.

The various technologies described herein may also be implemented in distributed computing environments where tasks are performed by remote processing devices that are linked through a communications network, e.g., by hardwired links, wireless links, or combinations thereof. In a distributed computing environment, program modules may be located in both local and remote computer storage media including memory storage devices.

Marine Computing System

FIG. 7 illustrates an example schematic of a marine electronics device 700 in accordance with implementations of various techniques described herein. The marine electronics device 700 includes a screen 705. In certain implementations, the screen 705 may be sensitive to touching by a finger. In other implementations, the screen 705 may be sensitive to the body heat from the finger, a stylus, or responsive to a mouse. The marine electronics device 700 may be attached to a National Marine Electronics Association (NMEA) bus or network. The marine electronics device 700 may send or receive data to or from another device attached to the NMEA 2000 bus. For example, the marine electronics device 700 may transmits commands and receive data from a motor or a sensor using an NMEA 2000 bus. In one implementation, the marine electronics device 700 may be capable of steering a vessel and controlling the speed of the vessel, i.e., autopilot. For example, one or more waypoints may be input to the marine electronics device 700, and the marine electronics device 700 may steer a vessel to the one or more waypoints. The marine electronics device 700 may transmit or receive NMEA 2000 compliant messages, messages in a proprietary format that do not interfere with NMEA 2000 compliant messages or devices, or messages in any other format. The device 700 may display marine electronic data 715. The marine electronic data types 715 may include chart data, radar data, sonar data, steering data, dashboard data, navigation data, fishing data, engine data, and the like. The marine electronics device 700 may also include a plurality of buttons 720, which may be either physical buttons or virtual buttons, or a combination thereof. The marine electronics device 700 may receive input through a screen 705 sensitive to touch or buttons 720.

As mentioned above, a marine computing system may be used to record and process sonar data. In one implementation, the marine computing system may take the form of a marine electronics device 700.

The marine electronics device 700 may be operational with numerous general purpose or special purpose computing system environments or configurations.

The marine electronics device 700 may include any type of electrical and/or electronics device capable of processing data and information via a computing system. The marine electronics device 700 may be a multi-function display (MFD) unit, such that the marine electronics device 700 may be capable of displaying and/or processing multiple types of marine electronics data. In particular, the MFD unit may include the computing system, the screen 705, and the buttons 720 such that they may be integrated into a single console.

The computing system may include a central processing unit (CPU), a system memory, a graphics processing unit (GPU), and a system bus that couples various system components including the system memory to the CPU. In various examples, the computing system may include one or more CPUs.

The CPU may include a microprocessor, a microcontroller, a processor, a programmable integrated circuit, or a combination thereof. The CPU can comprise an off-the-shelf processor such as a Reduced Instruction Set Computer (RISC), or a Microprocessor without Interlocked Pipeline Stages (MIPS) processor, or a combination thereof. The CPU may also include a proprietary processor.

The GPU may be a microprocessor specifically designed to manipulate and implement computer graphics. The CPU may offload work to the GPU. The GPU may have its own graphics memory, and/or may have access to a portion of the system memory. As with the CPU, the GPU may include one or more processing units, and each processing unit may include one or more cores.

The CPU may provide output data to a GPU. The GPU may generate graphical user interfaces that present the output data. The GPU may also provide objects, such as menus, in the graphical user interface. A user may provide inputs by interacting with the objects. The GPU may receive the inputs from interaction with the objects and provide the inputs to the CPU. A video adapter may be provided to convert graphical data into signals for a monitor. The monitor includes a screen 705. In certain implementations, the screen 705 may be sensitive to touching by a finger. In other implementations, the screen 705 may be sensitive to the body heat from the finger, a stylus, or responsive to a mouse.

The system bus may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory may include a read only memory (ROM) and a random access memory (RAM). A basic input/output system (BIOS), containing the basic routines that help transfer information between elements within the computing system, such as during start-up, may be stored in the ROM.

The computing system may further include a hard disk drive interface for reading from and writing to a hard disk, a memory card reader for reading from and writing to a removable memory card, and an optical disk drive for reading from and writing to a removable optical disk, such as a CD ROM or other optical media. The hard disk, the memory card reader, and the optical disk drive may be connected to the system bus by a hard disk drive interface, a memory card reader interface, and an optical drive interface, respectively. The drives and their associated computer-readable media may provide nonvolatile storage of computer-readable instructions, data structures, program modules and other data for the computing system.

Although the computing system is described herein as having a hard disk, a removable memory card and a removable optical disk, it should be appreciated by those skilled in the art that the computing system may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules, software modules, or other data. Computer-readable storage media may include non-transitory computer-readable storage media. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The computing system may include a host adapter that connects to a storage device via a small computer system interface (SCSI) bus, Fiber Channel bus, eSATA bus, or using any other applicable computer bus interface.

The computing system can also be connected to a router to establish a wide area network (WAN) with one or more remote computers. The router may be connected to the system bus via a network interface. The remote computers can also include hard disks that store application programs.

In another implementation, the computing system may also connect to the remote computers via local area network (LAN) or the WAN. When using a LAN networking environment, the computing system may be connected to the LAN through the network interface or adapter. The LAN may be implemented via a wired connection or a wireless connection. The LAN may be implemented using Wi-Fi™ technology, cellular technology, Bluetooth™ technology, satellite technology, or any other implementation known to those skilled in the art. The network interface may also utilize remote access technologies (e.g., Remote Access Service (RAS), Virtual Private Networking (VPN), Secure Socket Layer (SSL), Layer 2 Tunneling (L2T), or any other suitable protocol). In some examples, these remote access technologies may be implemented in connection with the remote computers. It will be appreciated that the network connections shown are exemplary and other means of establishing a communications link between the computer systems may be used.

A number of program modules may be stored on the hard disk, memory card, optical disk, ROM or RAM, including an operating system, one or more application programs, and program data. In certain implementations, the hard disk may store a database system. The application programs may include various mobile applications ("apps") and other applications configured to perform various methods and techniques described herein. The operating system may be any suitable operating system that may control the operation of a networked personal or server computer.

A user may enter commands and information into the computing system through input devices such as buttons 720, which may be physical buttons, virtual buttons, or combinations thereof. Other input devices may include a microphone, a mouse, or the like.

Certain implementations may be configured to be connected to a global positioning system (GPS) receiver system and/or a marine electronics system. The GPS system and/or marine electronics system may be connected via the network interface. The GPS receiver system may be used to determine position data for the vessel on which the marine electronics device 700 is disposed. The GPS receiver system may then transmit the position data to the marine electronics device 700. In other examples, any positioning system known to those skilled in the art may be used to determine and/or provide the position data for the marine electronics device 700.

The marine electronics system may include one or more components disposed at various locations on the vessel. Such components may include one or more data modules, sensors, instrumentation, and/or any other devices known to those skilled in the art that may transmit various types of data to the marine electronics device 700 for processing and/or display. The various types of data transmitted to the marine electronics device 700 from the marine electronics system may include marine electronics data and/or other data types known to those skilled in the art. The marine electronics data received from the marine electronics system may include chart data, sonar data, structure data, radar data, navigation data, position data, heading data, automatic identification system (AIS) data, Doppler data, speed data, course data, or any other type known to those skilled in the art.

In one implementation, the marine electronics system may include a radar sensor for recording the radar data and/or the Doppler data, a compass heading sensor for recording the heading data, and a position sensor for recording the position data. In a further implementation, the marine electronics system may include a sonar transducer for recording the sonar data, an AIS transponder for recording the AIS data, a paddlewheel sensor for recording the speed data, and/or the like. For example, the marine electronics system may include a sonar transducer 200 or 300.

The marine electronics device 700 may receive external data via the LAN or the WAN. In one implementation, the external data may relate to information not available from the marine electronics system. The external data may be retrieved from the Internet or any other source. The external data may include atmospheric temperature, tidal data, weather, moon phase, sunrise, sunset, water levels, historic fishing data, and other fishing data.

The detailed description is directed to certain specific implementations. It is to be understood that the discussion above is only for the purpose of enabling a person with ordinary skill in the art to make and use any subject matter defined now or later by the patent "claims" found in any issued patent herein.

It is specifically intended that the claimed invention not be limited to the implementations and illustrations contained herein, but include modified forms of those implementations including portions of the implementations and combinations of elements of different implementations as come within the scope of the following claims. Nothing in this application is considered critical or essential to the claimed invention unless explicitly indicated as being "critical" or "essential."

Reference has been made in detail to various implementations, examples of which are illustrated in the accompanying drawings and figures. In the detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits and networks have not been described in detail so as not to unnecessarily obscure aspects of the implementations.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations only and is not intended to be limiting of the present disclosure. As used in the description of the present disclosure and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

"Alternatively" shall not be construed to only pertain to situations where the number of choices involved is exactly two, but rather refers to another possibility among many other possibilities.

Additionally, various technologies and techniques described herein include receiving user requests for a number of different operations. In certain instances, the user request for a particular operation will be explicitly described. It shall be understood that a "request" or "can request" shall also include, but are not limited to, touching a screen, double tapping a screen (tapping the screen twice in rapid succession), pressing a particular physical or virtual button, making a selection from a menu, swiping the screen (placing a finger towards an edge of the screen and traversing the screen while maintaining contact between the finger and the screen) placement of a cursor at a particular location, stylus pointing, mouse selection, an audible command, as well as the explicit description of the "request" for the particular operations. While the foregoing is directed to implementations of various techniques described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A transducer array comprising:
   a first receiver having a first transducer width;
   a second receiver having a second transducer width that is substantially equal to the first transducer width, wherein the first receiver and the second receiver form a first subarray with a first pitch; and
   a transceiver having a third transducer width that is larger than the first transducer width and the second transducer width, wherein the transceiver and the second receiver form a second subarray with a second pitch, wherein the first pitch and the second pitch are equivalent, and wherein the transceiver and the first receiver form a third subarray with a third pitch that is the sum of the first pitch and the second pitch,
   wherein the transducer array is configured to provide first reflected signals received from the first receiver, second reflected signals received from the second receiver, and third reflected signals received from the transceiver to a controller, wherein the controller is operably connected to the first receiver, the second receiver, and the transceiver and is configured to:
      determine a coarse angle of incidence in a plane that corresponds to a vertical direction and a propagation direction of the transducer array by measuring a time delay between the first receiver and the second receiver;
      determine a medium resolution angle of incidence in the plane that corresponds to the vertical direction and the propagation direction of the transducer array by measuring a time delay between the second receiver and the transceiver; and
      determine a fine resolution angle of incidence in the plane that corresponds to the vertical direction and the propagation direction of the transducer array by measuring a time delay between the first receiver and the transceiver.

2. The transducer array of claim 1, wherein the third transducer width is greater than or equal to twice the width of the first or second transducer.

3. The transducer of claim 1, wherein the transceiver is configured to transmit a signal having a wavelength that is equivalent to the first transducer width or second transducer width.

4. A method comprising:
   transmitting acoustic signals with a transceiver of a transducer array;
   receiving first reflected signals at a first receiver of the transducer array;
   receiving second reflected signals at a second receiver of the transducer array;
   receiving third reflected signals at the transceiver, wherein:
      the first receiver has a first transducer width;
      the second receiver has a second transducer width that is substantially equivalent to the first transducer width; and
      the transceiver has a third transducer width that is larger than the first transducer width and the second transducer width;
   determining a coarse angle of incidence in a plane that corresponds to a vertical direction and a propagation direction of the transducer array by measuring a time delay between the first receiver and the second receiver;
   determining a medium resolution angle of incidence in the plane that corresponds to the vertical direction and the propagation direction of the transducer array by measuring a time delay between the second receiver and the transceiver; and determining a fine resolution angle of incidence in the plane that corresponds to the vertical direction and the propagation direction of the transducer array by measuring a time delay between the first receiver and the transceiver.

5. The method of claim 4, further comprising determining an angle of incidence, based on time delays between the first reflected signals, the second reflected signals and the third reflected signals, in the plane that corresponds to the vertical direction and the propagation direction of the transducer array.

6. The method of claim 4, wherein the transmitted acoustic signals have a wavelength that is less than double a pitch of a transducer array comprising the first receiver, second receiver and transceiver.

7. The method of claim 4, further comprising using the coarse angle of incidence to select the medium resolution angle of incidence or the fine resolution angle of incidence.

8. The method of claim 4, further comprising determining a distance to an underwater object or feature from the first reflected signals, the second reflected signals, and the third reflected signals.

9. The method of claim 4, wherein the transmitted acoustic signals have a wavelength equivalent to the first or second transducer width, a distance between the first receiver and the second receiver, or a distance between the second receiver and the transceiver.

10. A transducer array comprising:
a first receiver having a first transducer width and a first transducer length;
a second receiver having a second transducer width and a second transducer length, wherein the second transducer width is substantially equal to the first transducer width;
a first element forming a first portion of a transceiver, wherein the first element has a third transducer length; and
a second element forming a second portion of the transceiver, wherein the first element and the second element are separated by a space therebetween and electrically connected to form the entire transceiver such that the first element and the second element are configured to transmit and receive one or more signals, wherein the second element has a fourth transducer length, wherein the first transducer length, the second transducer length, the third transducer length, and the fourth transducer length are substantially equal,
wherein the transducer array is configured to provide first reflected signals received from the first receiver, second reflected signals received from the second receiver, and third reflected signals received from both the first element and the second element of the transceiver to a controller, wherein the controller is operably connected to the first receiver, the second receiver, and both the first element and the second element of the transceiver and is configured to:
determine a coarse angle of incidence in a plane that corresponds to a vertical direction and a propagation direction of the transducer array by measuring a time delay between the first receiver and the second receiver;
determine a medium resolution angle of incidence in the plane that corresponds to the vertical direction and the propagation direction of the transducer array by measuring a time delay between the second receiver and the transceiver; and
determine a fine resolution angle of incidence in the plane that corresponds to the vertical direction and the propagation direction of the transducer array by measuring a time delay between the first receiver and the transceiver.

11. The transducer of claim 10, wherein the transceiver is configured to transmit a signal having a wavelength that is equivalent to the first transducer width or second transducer width.

12. The transducer of claim 10, wherein a distance between the first receiver and the second receiver is approximately equivalent to a distance between the second receiver and the first element or a distance between the first element and the second element.

13. The transducer of claim 10, wherein the first element has a third transducer width, the second element has a fourth transducer width, and wherein each of the third transducer width and the fourth transducer width are equivalent to the first transducer width or the second transducer width.

\* \* \* \* \*